US010820183B2

(12) United States Patent
Meek et al.

(10) Patent No.: US 10,820,183 B2
(45) Date of Patent: Oct. 27, 2020

(54) SYSTEM AND METHOD FOR DEVICE CONTROL BASED UPON HOME OR AWAY DETECTION OF A MOBILE DEVICE

(71) Applicant: D&M Holdings, Inc., Kanagawa (JP)

(72) Inventors: Brian Meek, Indianapolis, IN (US); Nicholas Murrells, San Diego, CA (US)

(73) Assignee: D&M Holdings, Inc., Kanagawa (JP)

(*) Notice: Subject to any disclaimer, the term of this patent is extended or adjusted under 35 U.S.C. 154(b) by 0 days.

(21) Appl. No.: 16/323,325

(22) PCT Filed: Aug. 4, 2017

(86) PCT No.: PCT/US2017/045432
§ 371 (c)(1),
(2) Date: Feb. 5, 2019

(87) PCT Pub. No.: WO2018/027099
PCT Pub. Date: Feb. 8, 2018

(65) Prior Publication Data
US 2019/0380021 A1 Dec. 12, 2019

Related U.S. Application Data

(60) Provisional application No. 62/371,399, filed on Aug. 5, 2016.

(51) Int. Cl.
*H04W 8/00* (2009.01)
*H04W 4/021* (2018.01)
*H04L 29/12* (2006.01)

(52) U.S. Cl.
CPC .......... *H04W 8/005* (2013.01); *H04L 61/103* (2013.01); *H04L 61/2092* (2013.01); *H04L 61/3005* (2013.01); *H04W 4/021* (2013.01); *H04L 61/6022* (2013.01)

(58) Field of Classification Search
CPC . H04W 48/04; H04W 8/008; H04W 61/2092; H04L 61/03
USPC .......................... 455/515, 422.1, 426.2, 446
See application file for complete search history.

(56) References Cited

U.S. PATENT DOCUMENTS

| | | | |
|---|---|---|---|
| 7,962,954 B2 * | 6/2011 | Zavalkovsky | .......... H04L 63/08 726/4 |
| 8,200,776 B2 | 6/2012 | Goel et al. | |
| 8,577,392 B1 | 11/2013 | Pai et al. | |
| 8,868,220 B2 | 10/2014 | Crucs | |
| 8,880,648 B1 | 11/2014 | Arora et al. | |
| 8,886,217 B2 | 11/2014 | Reitter et al. | |
| 8,914,235 B1 | 12/2014 | Wichrowska et al. | |

(Continued)

OTHER PUBLICATIONS

European Search Report for EP 17837735.4 dated Nov. 20, 2019.

*Primary Examiner* — John J Lee
(74) *Attorney, Agent, or Firm* — Peter A. Nieves; Sheehan Phinney Bass & Green PA

(57) ABSTRACT

A first network enabled device is in a wireless local area network (WLAN). The first network enabled device determines whether a second network enabled device is present in the WLAN. The first network enabled device executes a rule having a condition based on whether the second network enabled device is present in the WLAN and a resulting action to be performed by the first network enabled device. If the condition is met, the first network enabled device performs the resulting action.

17 Claims, 9 Drawing Sheets

(56) References Cited

U.S. PATENT DOCUMENTS

| | | |
|---|---|---|
| 8,937,534 B2 | 1/2015 | Kreiner et al. |
| 9,137,570 B2 | 9/2015 | Hatambeiki et al. |
| 2008/0298330 A1 | 12/2008 | Leitch |
| 2009/0197524 A1 | 8/2009 | Haff et al. |
| 2010/0141437 A1 | 6/2010 | Karam et al. |
| 2012/0093141 A1 | 4/2012 | Imes et al. |
| 2012/0120930 A1 | 5/2012 | Ji et al. |
| 2012/0309373 A1 | 12/2012 | Abogendia |
| 2014/0031989 A1 | 1/2014 | Bergman et al. |
| 2014/0111315 A1 | 4/2014 | Geerlings et al. |
| 2014/0176310 A1 | 6/2014 | Kotlicki |
| 2014/0187200 A1 | 7/2014 | Reitter et al. |
| 2014/0309862 A1 | 10/2014 | Ricci |
| 2015/0002310 A1 | 1/2015 | Guo et al. |
| 2015/0006695 A1 | 1/2015 | Gupta |
| 2015/0179057 A1 | 6/2015 | Morimoto et al. |
| 2015/0037040 A1 | 11/2015 | Lyn-Shue |
| 2015/0334229 A1 | 11/2015 | Wohlert et al. |
| 2016/0021502 A1 | 1/2016 | Kim |
| 2016/0210832 A1* | 7/2016 | Williams ............... G08B 13/24 |
| 2018/0067969 A1* | 3/2018 | Huang ................... H04L 67/06 |

\* cited by examiner

```
Interface: eth1, datalink type: EN10MB (Ethernet)
Starting arp-scan 1.8.1 with 256 hosts (http://www.nta-monitor.com/tools/arp-scan/)
192.168.1.1    e4:f4:c6:05:bb:07    (Unknown)
192.168.1.4    00:10:7f:53:74:08    CRESTRON ELECTRONICS, INC.
192.168.1.6    5c:dc:96:c0:9a:fb    (Unknown)
192.168.1.14   6c:dc:96:82:cd:98    (Unknown)
192.168.1.16   00:05:cd:6a:bc:c0    Denon, Ltd.
192.168.1.9    00:05:cd:3d:2a:f9    Denon, Ltd.
192.168.1.11   00:05:cd:3b:c5:57    Denon, Ltd.
192.168.1.7    00:05:cd:69:51:8e    Denon, Ltd.
8 packets received by filter, 0 packets dropped by kernel
Ending arp-scan 1.8.1: 256 hosts scanned in 1.361 seconds (188.10 hosts/sec). 8 responded
```

SYSTEM AND METHOD FOR DEVICE CONTROL BASED UPON HOME OR AWAY DETECTION OF A MOBILE DEVICE

CROSS-REFERENCE TO RELATED APPLICATIONS

This application is the National Stage of international Application No. PCT/US17/45432, filed Aug. 4, 2017 and entitled "System and Method for Device Control Based Upon Home or Away Detection of a Mobile Device", which claims the benefit of U.S. Provisional Application No. 62/371,399, filed Aug. 5, 2016 and entitled "Home and Away Detection of a Mobile Device". The contents of these prior applications are incorporated by reference herein in their entirety.

FIELD OF THE INVENTION

The present invention relates to networking, and more particularly, is related to detection of devices in a network.

BACKGROUND OF THE INVENTION

In the course of a day, an individual carrying a network enabled device may communicate with several communication networks, and/or be tracked by several location services. As shown in FIG. 1, an individual with the network enabled device 110, such as a smart phone, may communicate via a home local area network (LAN) 160, for example, a wireless network (WLAN). The network enabled device 110 may join the WLAN 160 when in proximity of a WLAN access point, and may be dropped from the WLAN 160 when not in proximity of the WLAN access point. Many WLANs have security features where the network enabled device 110 must exchange secure credentials with the WLAN before being admitted to communicate via the WLAN.

Upon leaving the home WLAN 160, the network enabled device 110 may communicate with a cell network via a cell tower 150. Similarly, the network enabled device 110 may communicate with the cell tower 150 from a network enabled vehicle 120, for example via a BlueTooth link between the network enabled device 110 and the network enabled vehicle 120. The network enabled device 110 may join a public WiFi network 130, for example, in the lobby of an office building, and may thereafter join a private office WiFi network 140.

Determining the physical location of the network enabled device 110 may be accomplished via several methods, including global positioning system (GPS), a space-based navigation system that provides location and time information anywhere on Earth where there is an unobstructed line of sight to four or more GPS satellites 180. The United States government created and maintains GPS and makes it freely accessible to anyone with a GPS receiver.

However, there are scenarios where GPS may provide inadequate location services. For example, it may be difficult for a GPS tracker to determine if a GPS device is in a specific room, or even a specific floor in a multi-level building. Further, in certain locations, for example, in urban environments and indoors, GPS signals may be distorted by radio interference.

Another location determination technique is using triangulation of WiFi radio signals, alone, or in combination with GPS. This may be done by taking a snapshot of the various WiFi access points within range and using a simple triangulation technique based on the known location of each access point. However, location accuracy may depend upon the number of access points within range of the network enabled device 110, and the relative orientation of the network enabled device 110 to the access points. Location may also be provided based on triangulation of the network enabled device 110 from two or more cell towers 150. However, like WiFi resolution, cell based location may have poor accuracy characteristics.

Existing audio streaming services may associate a user with an application running in the network enabled device 110. However, a pairing of a user with the network enabled device 110 may be inaccurate, for example, when there are multiple users of a streaming service account, or if a user has multiple rendering devices with the same name. Therefore, there is a need in the industry to address one or more of the abovementioned shortcomings.

SUMMARY OF THE INVENTION

Embodiments of the present invention provide a system and method for device control based upon home or away detection of a mobile device. Briefly described, the present invention is directed to a first network enabled device in a wireless local area network (WLAN). The first network enabled device determines whether a second network enabled device is present in the WLAN. The first network enabled device executes a rule having a condition based on whether the second network enabled device is present in the WLAN and a resulting action to be performed by the first network enabled device. If the condition is met, the first network enabled device performs the resulting action.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

FIG. 8 is a screen capture of an exemplary address resolution protocol (ARP) network scan process.

DETAILED DESCRIPTION

Figure 1:
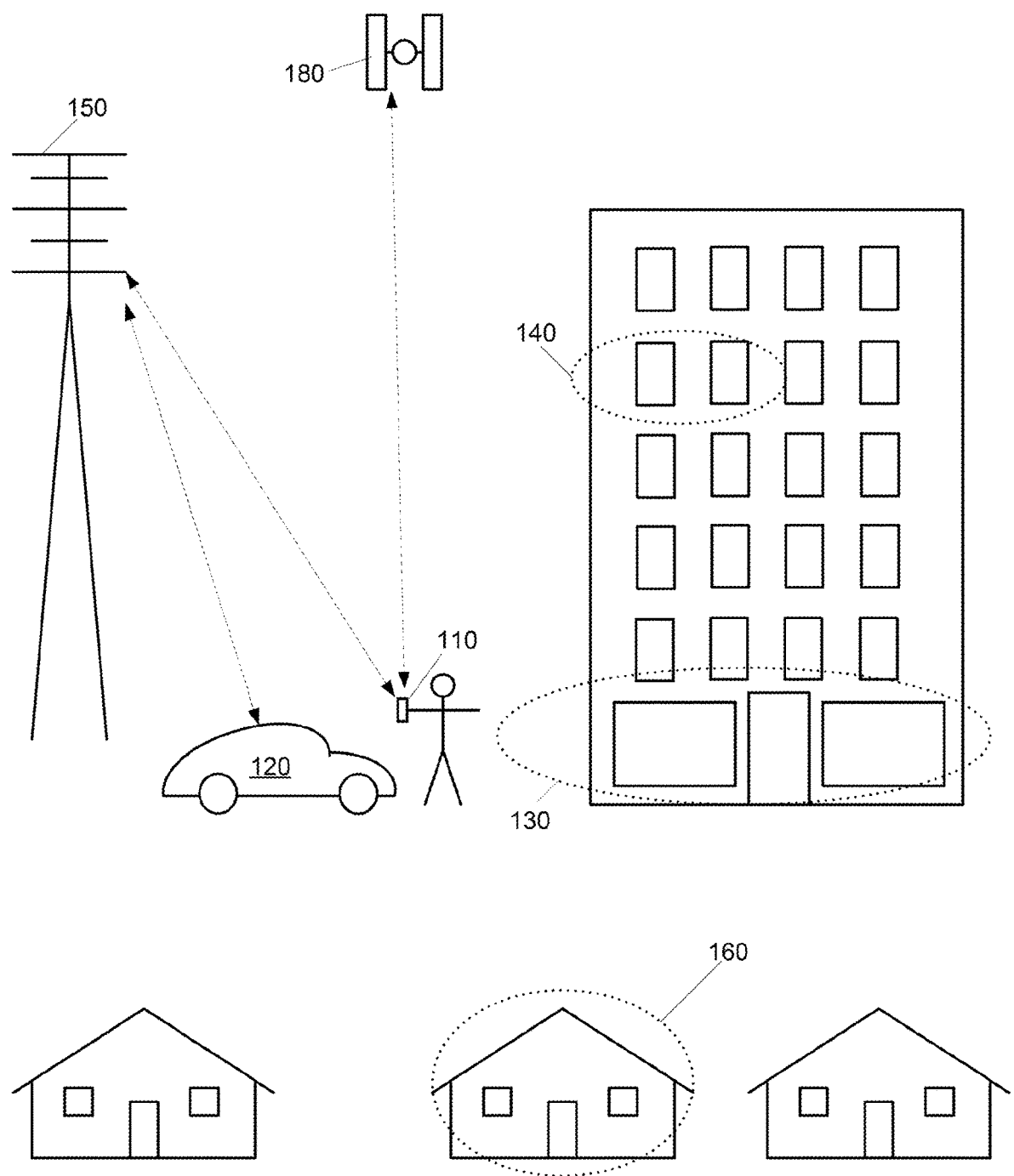
FIG. 1 is a schematic diagram of several location and networking services an individual may access during a typical day.
Figure 1:
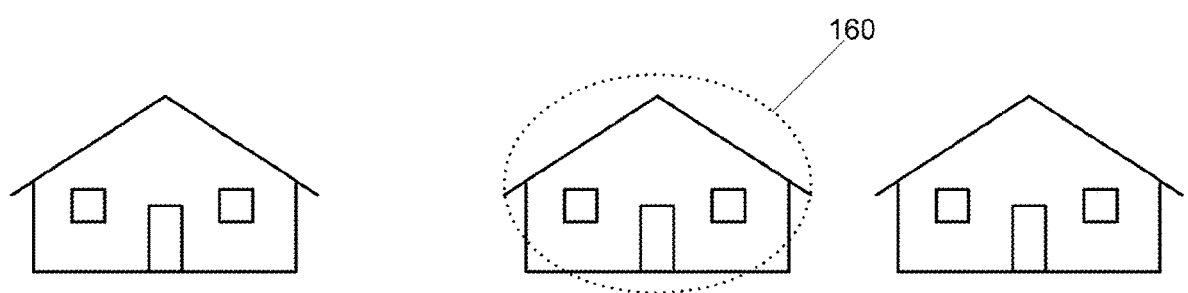

Reference will now be made in detail to embodiments of the present invention, examples of which are illustrated in the accompanying drawings. Wherever possible, the same reference numbers are used in the drawings and the description to refer to the same or like parts.

As used within this disclosure, a "player" refers to an exemplary audio and/or audio/video device, for example, a powered speaker, preamp, amplifier, receiver, etc. The term player may not indicate that the audio device is capable, on its own, of rendering an audio and/or audio/video signal.

As used within this disclosure, a "network" and/or "data network" refers to a communications network configured to exchange binary formatted information between two or more addressable networked devices via one or more data routers implementing a data routing protocol, for example, an IP network. For example, a data network may be distinguished from a short distance wireless network such as a Bluetooth or RF network, or a half or full duplex infrared (IR) and/or radio frequency (RF) communication link between two devices, for example, a remote control and an audio receiver.

As used within this disclosure, "network credentials," or "credentials" may refer to, but is not limited to, information used to determine the identity of a device or party for purposes of network security. Credentials may include, for example, the type of network protocol, the network name for example an SSID (Service Set Identifier), the type of security used by that network (WEP, WPA, etc.), and a password for that network.

As used within this disclosure, "media" refers to audio and/or video content either stored on a storage medium, such as a disk drive or digital disk, or streamed from a media server. Media may refer to analog and/or digitally formatted data. A specific recorded program and/or performance is referred to as a media program.

As used within this disclosure, a provider of media, either streamed or locally stored, is referred to as a "media source." Examples of a media source include a music and/or video server, an internet radio station, a streaming service, or a cache of media files.

As used within this disclosure, "rendering" refers to playback of a media program by a media player, also referred to herein as a "rendering device." Examples of rendering devices include, but are not limited to an mp3 player, a tablet computer, a portable stereo, a home entertainment system, a portable video player, a smart phone, a laptop or desktop computer, and a mobile entertainment system. A rendering device may be configured to produce sound, for example via at least one audio transducer (speaker) used to render the media audio portion, to display video, for example, via a video screen or monitor, or the rendering device may provide a signal, such as an electrical signal (wired or wireless) and/or an optical signal, to convey the rendered audio and/or video to another device having a transducer and/or display.

As used within this disclosure, a "controller" refers to a device, for example, a hand held device or an application running on a hand held device configured to interact with a media rendering device, and/or with one or more groups of media rendering devices, where each of one or more groups is configured to render the same or different media programs. The controller may interact with the media rendering device by issuing commands to adjust one or more operating parameters on the media rendering device, and/or to display operational status of the media rendering device. Examples of a hand held device include a smart phone or tablet computer.

As used within this disclosure, a "network enabled device" generally refers to a portable electronic device configured to communicate via a network and configurable to act as a controller and/or a renderer. Examples of a network enabled device include, but are not limited to, a smart phone, a tablet computer, and other portable computing devices. A "network enabled vehicle" may refer to a vehicle transporting a portable network enabled device, or may refer to a vehicle with an integral network enabled device.

As used within this disclosure "joining a network" generally refers to a network enabled device exchanging credentials with a network element, for example, a WLAN access point, so that the network enabled device is recognized by the network element, for example, a record of the network enabled device is stored within a routing table of the network element. Similarly, "leaving a network" generally refers to a network enabled device losing contact with the network element, for example, due to physically leaving the proximity of the network element or by disabling its network interface (such as by powering down or configuring the network enabled device to disconnect from the network) so that the network enabled device is no longer recognized by the network element, for example, a record of the network enabled device is purged from the routing table of the network element, such that the network enabled device would need to exchange credentials with the network element again in order to re-join the network.

A device that is detected to be within a local network is considered to be "home," while a device that is not detected to be within a local network is considered to be "away."

As used within this disclosure, a "user" may refer to an individual consuming media from a media rendering device, an individual operating a controller for the media rendering device, and/or a user of a network enabled device.

As used within this disclosure, a "playlist" is a modifiable data structure containing an ordered list of media, or an ordered list of references to media. A playlist may be stored, for example, on a rendering device or a server, or within a storage medium, such as a hard drive, thumb drive, or optical disc. A playlist may be modified to add, remove, and/or re-order media or media references. Since playlists containing media references do not contain audio or video content, they are generally small in size and therefore readily transportable. A display playlist is a text listing of media in a playlist, and may include a subset of identifying parameters of a media, such as title, artist, duration, and date, among others. A play queue refers to a playlist that is currently being rendered by a rendering device. The head of the play queue refers to the next media file to be rendered after the currently rendered media program, while the tail of the play queue refers to the location of the play queue indicating the final media in the play queue to be rendered.

As used within this disclosure, "streaming" refers to a process of real-time transmitting of a media program by a source to a rendering device. The rendering device may begin rendering the media before the entire program has been transmitted. Streaming is generally transitory, such that the streamed data is not retained after it has been rendered. Portions of a received stream may be buffered for rendering, for example, to ensure rendering is uninterrupted during short interruptions of the streamed transmission. In contrast, a downloaded digital multimedia file is generally received in its entirety before it may be rendered. A downloaded digital multimedia file is generally retained in a memory for subsequent rendering, while a streamed file is generally re-streamed for subsequent renderings. "Streaming a song" is shorthand for streaming audio media.

As used within this disclosure, "GUI" is a graphical user interface, and in particular, may be a touch-screen interface or an on-screen TV based interface. A graphical user interface or GUI, sometimes pronounced /ˈɡuːi/("gooey") is a type of interface that allows users to interact with electronic devices through graphical objects, or icons, and visual indicators such as secondary notation, referred to herein as "objects," as opposed to text-based interfaces, typed command labels or text navigation. It should be noted a graphical icon may include text, or may entirely consist of text. An ordered list of objects in a GUI may be referred to as a "menu." Menus may be stationary, may drop down from top of the display (a "drop-down menu"), or may pop up to fill the screen or a portion of the screen when an object is selected (a "pop-up menu"). The actions in the GUI are usually performed through direct manipulation of the objects. As used herein, "selecting" refers to touching an object, for example with a finger or stylus. Selecting may also be accomplished without a touch screen, for example, with a TV UI using a remote control and an item on screen which is highlighted then selected by the user pressing a button on the remote control.

As described in the Background section, people (users) often carry a network enabled device 110 such as a smart phone with them much of the time. Each such network enabled device 110 may have a unique hardware identifier, for example, the MAC (media access control) address. Under exemplary embodiments of the current invention, the presence in a premises of a user of a network enabled device 110 may be deduced by detection of the network enabled device 110 with the corresponding unique ID connected to the WLAN 160 (FIG. 1).

An application, for example, an application running on a network enabled device 110 connected to the WLAN, may monitor the WLAN 160 for a specific network enabled device 110 and may conclude the user of the detected network enabled device 110 is present within the premises where the WLAN 160 physically resides if the network enabled device 110 of the user is connected to WLAN 160 used in the premises. The application may then perform an action based on the assumption that the user is present or absent from the premises.

Figure 2A:
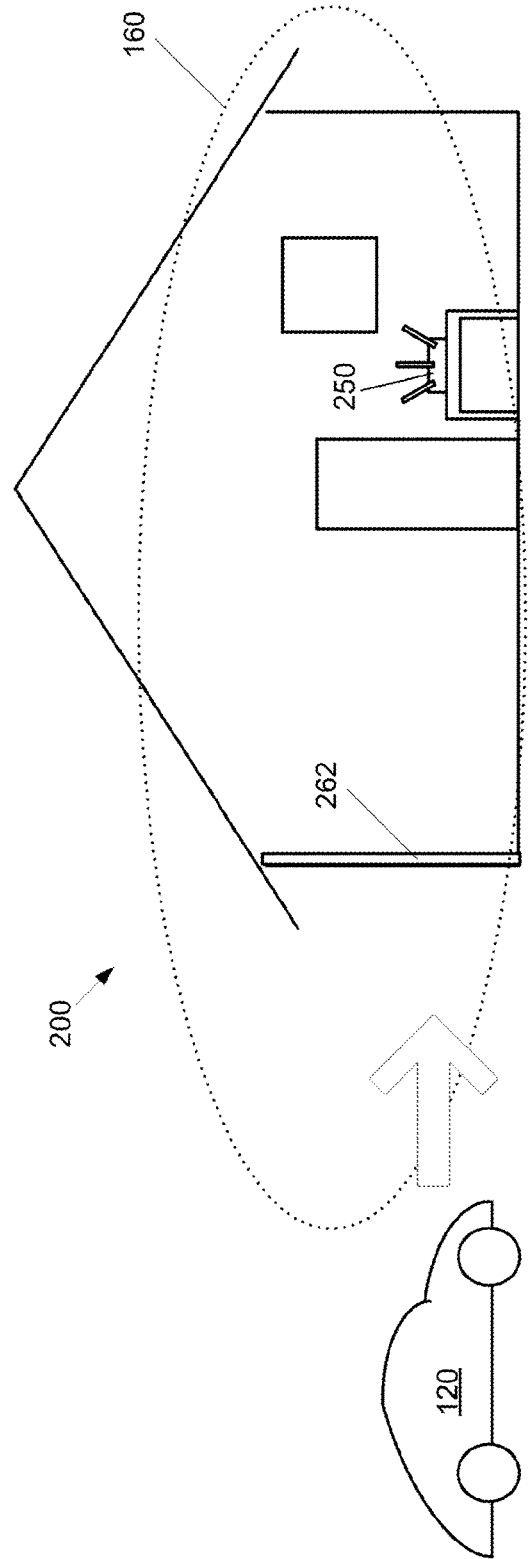
FIG. 2A shows a vehicle approaching a first embodiment of a home or away detecting system.
Figure 2B:
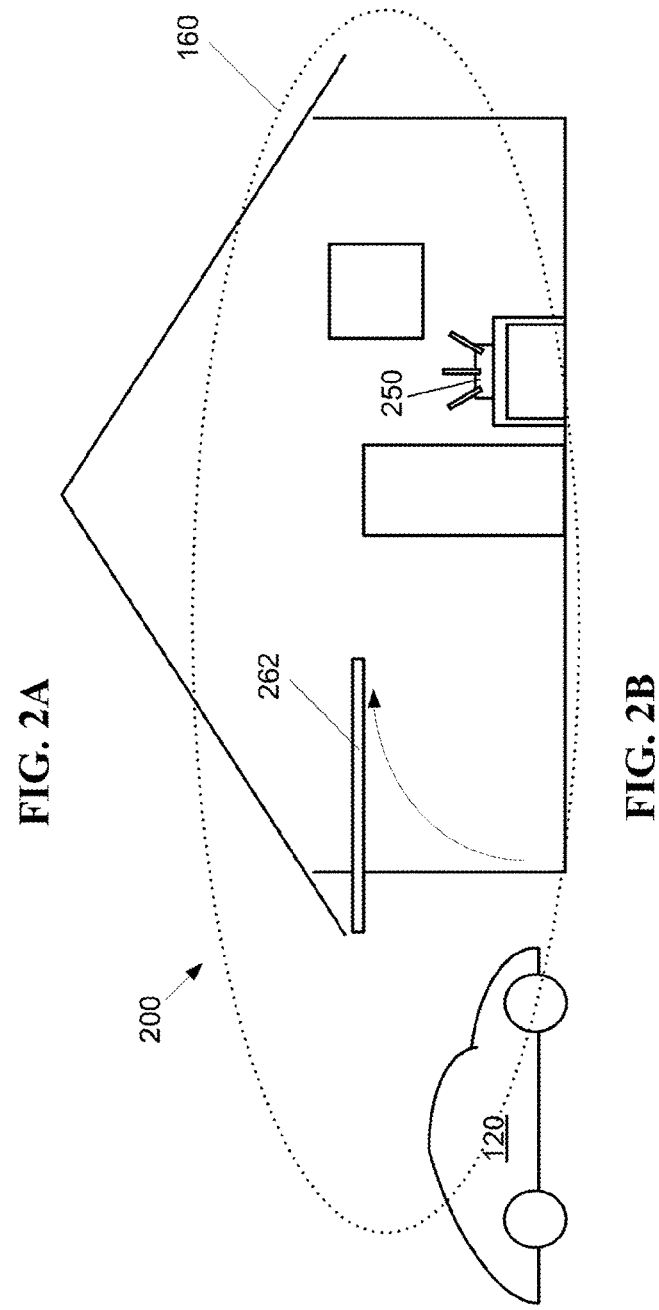
FIG. 2B shows a vehicle entering WLAN coverage for the first embodiment of a home or away detecting system.

For example, as shown in FIGS. 2A-2B, under a first embodiment of a home or away detecting system 200 a networked garage door opening device 262 may be in communication with a home WLAN 160 via an access point (AP) 250. The home WLAN 160 range may extend somewhat outside the home, for example, into a driveway of the home. When a network enabled vehicle 120 comes within range of the home WLAN 160, the garage door opening system 262 may detect that the network enabled vehicle 120 has joined the home WLAN 160, and thereafter accept commands from the network enabled vehicle 120 to open the garage door 262, as shown by FIG. 2B. Similarly, after the network enabled vehicle 120 has left the home WLAN 160, the garage door opening system 262 may detect that the network enabled vehicle 120 has left the home WLAN 160, and thereafter not accept commands from the network enabled vehicle 120 to open the garage door 262, until the network enabled vehicle returns to the WLAN 160. Other options are also possible. For example, the garage door opening system 262 may be configured to close the garage door when the garage door opening system 262 has detected that the network enabled vehicle 120 has left the home WLAN 160. The method for detecting whether the network enabled vehicle 120 is connected to the home WLAN 160 is described further below (see FIGS. 6-7).

Figure 3A:
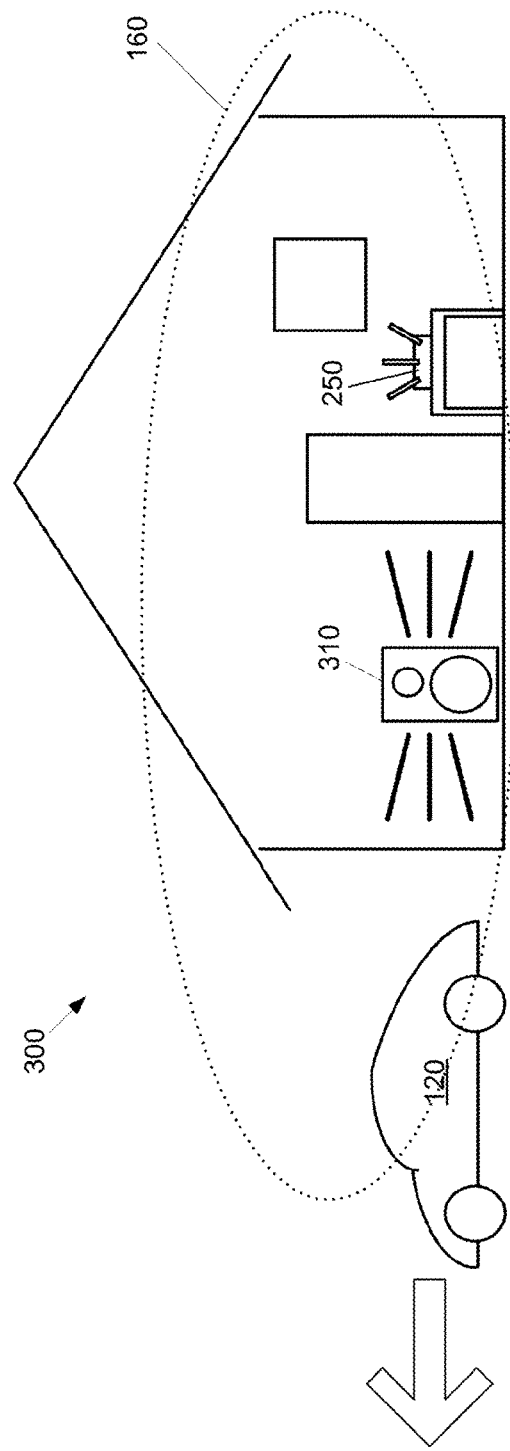
FIG. 3A shows a second embodiment of a home or away detecting system wherein a vehicle is leaving a WLAN.
Figure 3B:
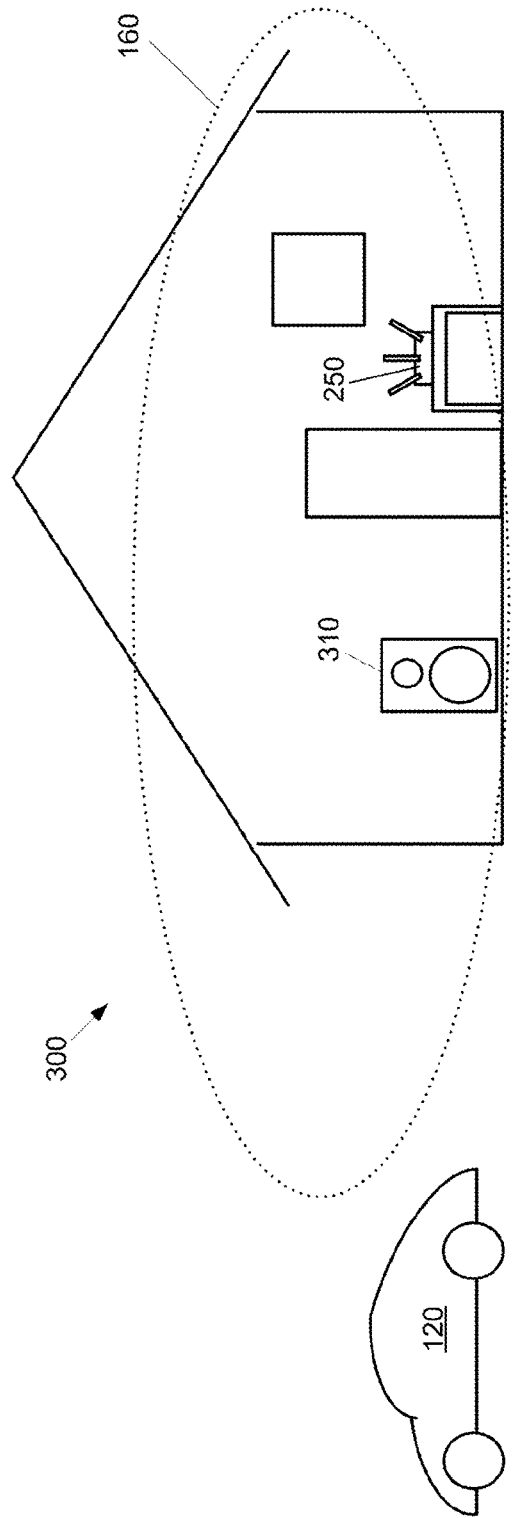
FIG. 3B shows the second embodiment of a home or away detecting system responding to the departure of the vehicle of FIG. 3A from the WLAN.

For example, as shown in FIGS. 3A-3B, under a second embodiment of a home or away detecting system 300, the system includes a home WLAN 160 that communicates via an access point (AP) 250, and a wireless networked media rendering system 310 in communication with the WLAN 160. The wireless networked media rendering system 310 may be configured to perform the action based on one or more rules stored in the system 200. For example, the rules may be stored on, and administered by, the wireless networked media rendering system 310.

The wireless networked media rendering system 310 may be configured to detect a first condition when a network enabled vehicle 120 is connected to the home WLAN 160 ("is present"), and may be configured to detect a second condition when the network enabled vehicle 120 is not connected to the home WLAN 160 ("is not present"). The wireless networked media rendering system 310 may further be configured to execute an action based upon a rule, for example, a rule stored in memory of the wireless networked media rendering system 310. A rule may be satisfied if each of one or more conditions of the rule is determined to be true.

For example, as shown in FIG. 3A, the wireless networked media rendering system 310 may be rendering media ("playing a song") when the wireless networked media rendering system 310 detects the network enabled vehicle 120 is no longer present in the WLAN 160. In the second embodiment, the wireless networked media rendering system 310 is configured to execute a first action when all of the conditions for a rule are detected. As shown in FIG. 3B, the wireless networked media rendering system 310 may execute the action of stopping rendering of media based upon detecting the conditions of the rule, in this case, detecting that the wireless networked media rendering system 310 is rendering media (a first condition) and detecting that the network enabled vehicle 120 is not present in the WLAN 160 (a second condition).

Similarly, the wireless networked media rendering system 310 may be configured to perform other actions based on other rules. While FIGS. 2A-2B, 3A-3E, and 4A-4C show a network enabled vehicle 120, the described embodiments are similar when applied to other types of network enabled devices 110 (FIG. 1), for example, but not limited to smart phones, tablet computers, smart watches, network enabled wrist bands, and other such devices. Similarly, rules may be configured to associate a specific user with more than one network enabled device 110 (FIG. 1). For example, the presence of a user within the premises may be deduced by detection of one or more network enabled devices 110 (FIG. 1) associated with the user, for example, a cell phone, a vehicle, a laptop computer, and/or a tablet computer.

Many types of conditions may be defined. Conditions may be state variables, for example, a function of the media rendering device 310 being on or off, or the presence of a network enabled device 110 (FIG. 1) being detected or not detected. Conditions may be time based, for example, a rule may only be configured to execute an action during defined time windows, for example, based on time of day, day of the week, or specific time ranges and/or date ranges, or a combination thereof.

The wireless networked media rendering system 310 may provide default actions associated with a condition. For example, the wireless networked media rendering system 310 may assign an action of "stop rendering" when a network enabled device 110 (FIG. 1) changes from being detected to not detected.

Conditions may be defined by a user, or learned wireless networked media rendering system 310. For example, a user may define a rule that associates the action of turning off music rendering when the condition occurs that network enabled device 110 (FIG. 1) changes from being detected to not detected. The wireless networked media rendering system 310 may log actions and conditions and periodically review the logs to determine temporal relationships between repeated actions and conditions. For example, wireless networked media rendering system 310 may be configured to log a first timestamp of a first event indicating a change in a configuration state of a first network enabled device, and to log a second timestamp of a second event indicating when a second network enabled device becomes present in the network and/or is no longer present in the network. The wireless networked media rendering system 310 may periodically review the logs to correlate events, and note repeated occurrences of these correlated events.

The wireless networked media rendering system 310 may then notify the user of such a repeated temporal relationship between a repeated action and condition and inquire whether the user wishes to define a rule associating the action and the condition. In this way, the wireless networked media rendering system 310 may learn a user's home/away behavior over time by keeping track of when they come and go from the network.

Figure 3C:
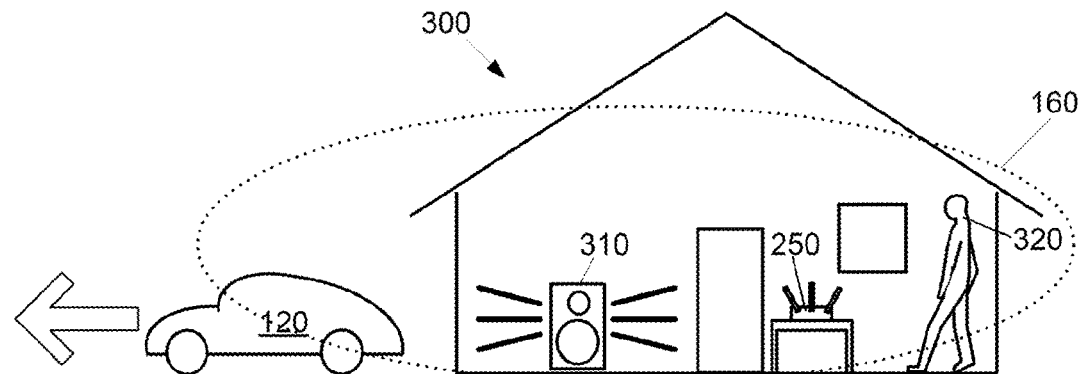
FIG. 3C shows a variation of the second embodiment of a home or away detecting system responding to the departure of the vehicle of FIG. 3A while another individual is detected within the WLAN.
Figure 3D:
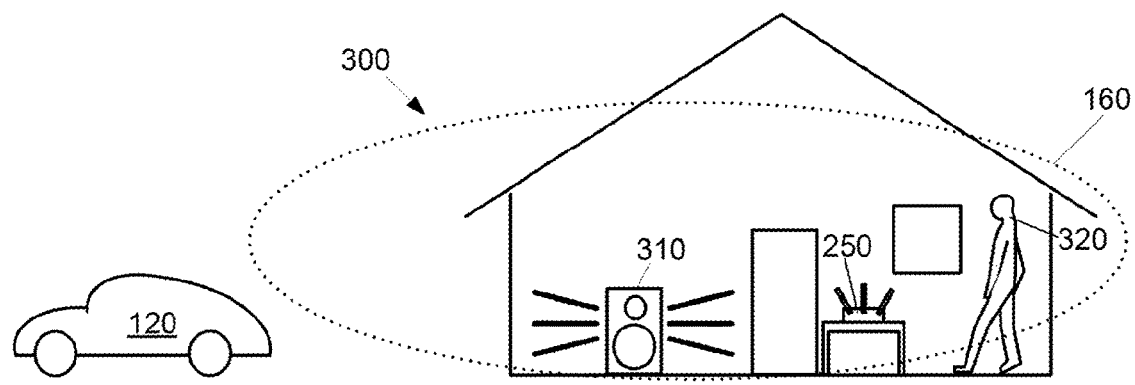
FIG. 3D shows a variation of the second embodiment of a home or away detecting system maintaining the state of FIG. 3C after the departure of the vehicle while another individual is detected.
Figure 3E:
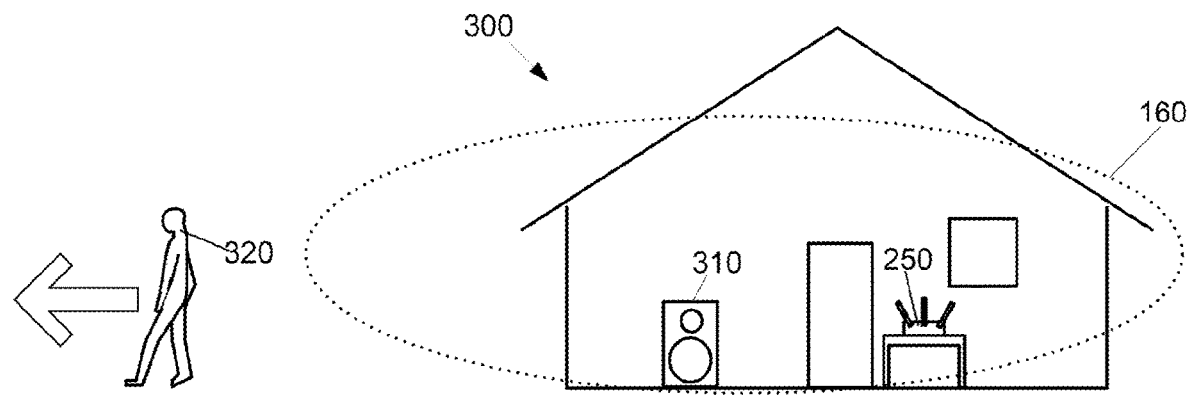
FIG. 3E shows a variation of the second embodiment of a home or away detecting system responding to the departure of the vehicle of FIG. 3C and the departure of the other individual.

Rules may take into account the presence of one or more individuals, based on detection of network enabled devices 110 (FIG. 1), associated with one or more individuals. For example, as shown in FIGS. 3C-3E, a network enabled vehicle 120 may be associated with a first individual, and a smart phone may be carried by a second individual 320. The wireless networked media rendering system 310 may be configured with a rule that the wireless networked media rendering system 310 stops rendering media when neither the first nor the second individual is present in the WLAN 160. Here, there are three conditions: (1) the wireless networked media rendering system 310 is rendering media, AND (2) the first individual is not present, AND (3) the second individual is not present. As used herein, an individual is regarded as present or not present in the WLAN 160 based on the detection state (detected/not detected) of a network enabled device 110 (FIG. 1) associated with the individual.

Rules may incorporate logical operators, for example, binary logical operators such as NOT, AND, OR, NAND, NOR, XOR, etc. For example, a rule may be satisfied based on "condition A AND (condition B OR condition C)". In FIG. 3C, the wireless networked media rendering system 310 is configured to execute the action of stopping rendering media if neither the network enabled vehicle 120 of the first individual is present nor the second individual 320 is present. Here, the rule may look like:

Conditions:
(1) wireless networked media rendering system 310 is rendering media, AND
(2) vehicle 210 is not present, AND
(3) the second individual 320 is not present.
Action: stop rendering media In FIG. 3D, the network enabled vehicle 120 of the first individual is no longer present, and the wireless networked media rendering system 310 continues rendering media because the second individual 320 is still present. However, in FIG. 3E, neither the network enabled vehicle 120 of the first individual is present nor the second individual 320 is present, so the wireless networked media rendering system 310 executes the action of stopping rendering the media.

Figure 4A:
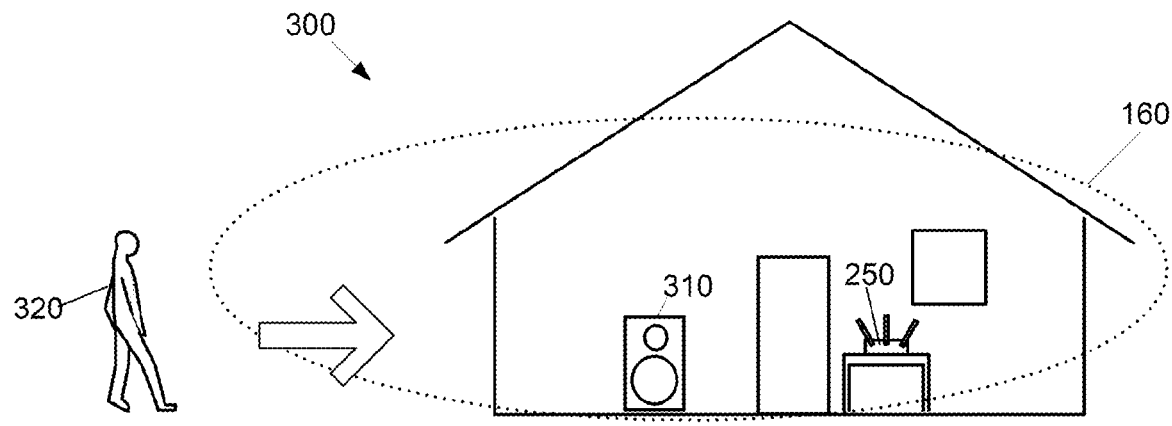
FIG. 4A shows an example of a time window condition under the second embodiment of a home or away detecting system in a first state where no device is detected.
Figure 4B:
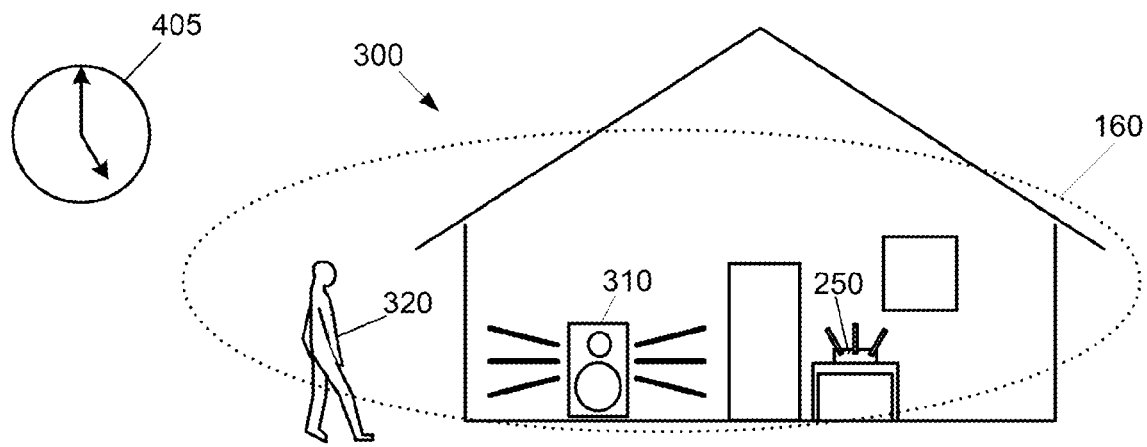
FIG. 4B shows an example of the time window condition under the second embodiment of the home or away detecting system in a second state where a device is detected in a first time window.
Figure 4C:
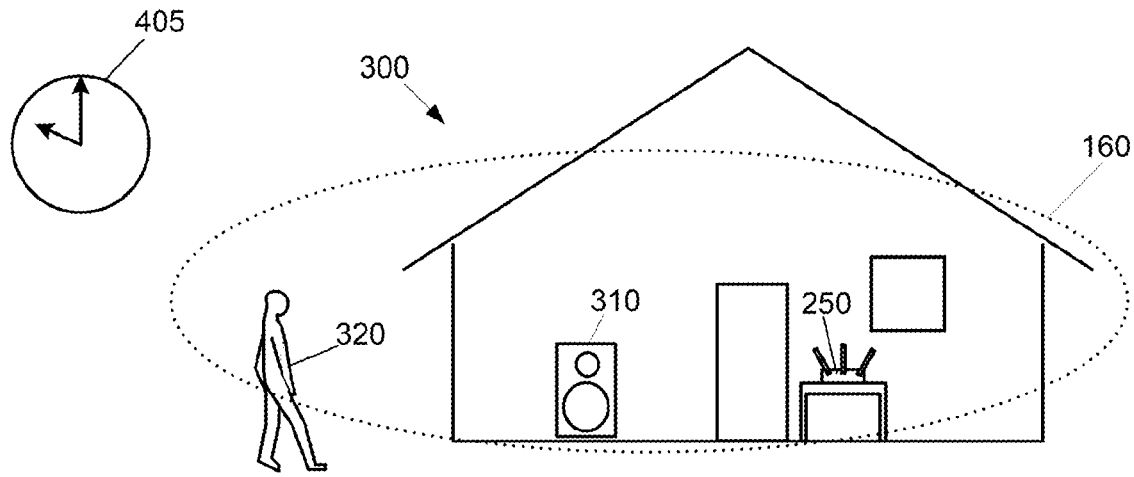
FIG. 4C shows an example of the time window condition under the second embodiment of the home or away detecting system in a third state where a device is detected in a second time window.

FIGS. 4A, 4B, and 4C show an example of a time window condition under the second embodiment of a home or away detecting system. The wireless networked media rendering system 310 may be configured to begin rendering media (e.g., playing a song on the home audio system) when an individual 320 is detected as being present after being not present, for example, when the individual 320 returns home. A condition for the rule for the wireless networked media rendering system 310 may be based on the time of day the wireless networked media rendering system 310 determines the individual 320 is detected as being present after being not present in the WLAN 160.

Similarly, a condition for a rule may be based on the amount of elapsed time between two detected events. For example, a first event may be a first device being detected in the WLAN 160, and a second event may be a second device being detected in the WLAN. The amount of time between the first and the second event may be used as a rule criteria, for example: IF the first event AND the second event occur within an elapsed time, perform an action. Other criteria may be based on other conditions. For example, in a premises having two or more access points, a criteria may be based on the location of a detected event. For example, if one or more devices are detected upstairs and no devices are detected downstairs, turn off a media rendering device 310 located downstairs.

As shown in FIG. 4A, an individual 320 carrying a network enabled device (not shown) is outside the range of a home WLAN 160. The home WLAN 160 is accessed via the AP 250. A wireless networked media rendering system 310 on the WLAN 160 is not presently rendering media. As shown in FIG. 4B, the individual 320 carrying a network enabled device (not shown) comes inside the range of a home WLAN 160 at 5 PM (shown by clock 405), and exchanges credentials with the WLAN 160 via the AP 250. The wireless networked media rendering system 310 detects the individual is present in the WLAN 160 (as described below), and checks for a rule matching current conditions.

Conditions:
(1) wireless networked media rendering system 310 is NOT rendering media, AND
(2) the individual 320 becomes present, AND
(3) the time is between 4 PM and 7 PM.
Action: start rendering media Here, the action is performed because all the conditions for a rule are met. As shown by FIG. 4C, in a similar scenario at a different time, namely 10 PM, the action is not executed, as conditions (1) and (2) were met, but condition (3) was not.

The media to be rendered by the wireless networked media rendering system 310 may be, for example, a default playlist, a random playlist, a media stream (such as an internet streaming service), or another media source. Several other conditions may be applied. For example, the choice of media to be rendered may be selected, and that choice may be determined based on, for example, the time of day, the day of the week, or other criteria.

Other actions by the wireless networked media rendering system 310 may include, for example, selecting a playlist based on preferences of detected individuals, adding/removing songs from a playlist of the media rendering system based on the predetermined preferences of two or more detected individuals.

The embodiments are not restricted to media rendering systems. Smart light switches, fans, ovens, coffee makers, and security systems, to name a few, may also modify their behavior based upon the detected presence or absence of one or more individuals within a WLAN.

The invention may be used to track the behavior patterns of an individual, for example, to determine when an individual moves from a first WLAN 160 (his home), to a second WLAN 120 (FIG. 1) (his vehicle) to a third WLAN 140 (FIG. 1) (his office). The detection of such movement may be used to meet conditions for rules in the first, second, and/or third WLAN based upon rules of first, second, and third WLANs and the presence detection in the first, second, or third WLAN. For example, the first, second, and third WLANs may communicate presence information, for example, via the internet, to exchange information regarding the comings and goings of an individual, and such information may be used as rule conditions.

Movement of an individual between networks may be used to configure the user interface on the media rendering systems 310 in one or more locations. For example, two associated media rendering systems 310 may communicate with one another, for example, via a remote server, and share information that a phone has left one physical location (e.g. first LAN) and moved to another physical location with a second LAN. The systems may then reflect the comings and goings of individual users, for example, only displaying devices in the same physical location as the phone being available for control by the phone.

The information that the network enabled device 110 (FIG. 1) has left one location and been detected at another location may also be used, for example, to distinguish between the network enabled device 110 (FIG. 1) physically leaving a location and a device being powered off. Other parameters associated with a user may migrate from one system to another with detected motion of the network enabled device 110 (FIG. 1), for example, a playlist being rendered at a first location may be resumed at the second location when the system in the second location detects the phone in the LAN of the second location.

Networked media rendering systems 310 may share information regarding movement of network enabled devices 110 (FIG. 1) between networks for other purposes as well, for example, to identify groups of users with similar coming/going patterns to devise useful suggestions for settings users in these group may wish to make and accelerate pattern recognition. Examples of these groups may include shift workers, families with children, office workers, and other groups. The collected group data may also be combined with data collected by other means, such as survey information.

A specific media rendering system 310 may also update playlists based in part on the preferences of users associated with devices detected in the network, in this case WLAN 160. For example, the media rendering system 310 may update a presently rendered playlist by selecting media according to commonly identified musical tastes, or may alternate selections based on preferences of detected users.

Home or away status, in conjunction with time windows, may be used for home security purposes. For example, a media rendering system may begin to render media when no network enabled devices 110 (FIG. 1) are detected during a specified time window to give passers-by or intruders the impression that the premises is occupied. The selection of media in this scenario may further provide the illusion that the premises is occupied, for example special content, such as talk radio or a podcast.

Additional capabilities of the wired networked media rendering system 310 and network enabled devices 110 (FIG. 1) may also be leveraged. For example, a network enabled device 110 (FIG. 1) with GPS capabilities may use GPS to distinguish between a network enabled device 110 (FIG. 1) physically leaving a location from a network enabled device 110 (FIG. 1) that is merely powered off. Similarly, a network enabled device 110 (FIG. 1) that is both WiFi and cellular enabled may report its internet connection has changed from Wi-Fi to cellular, indicating the network enabled device 110 (FIG. 1) has left the home WLAN 160 (not just that the battery died).

Figure 6:
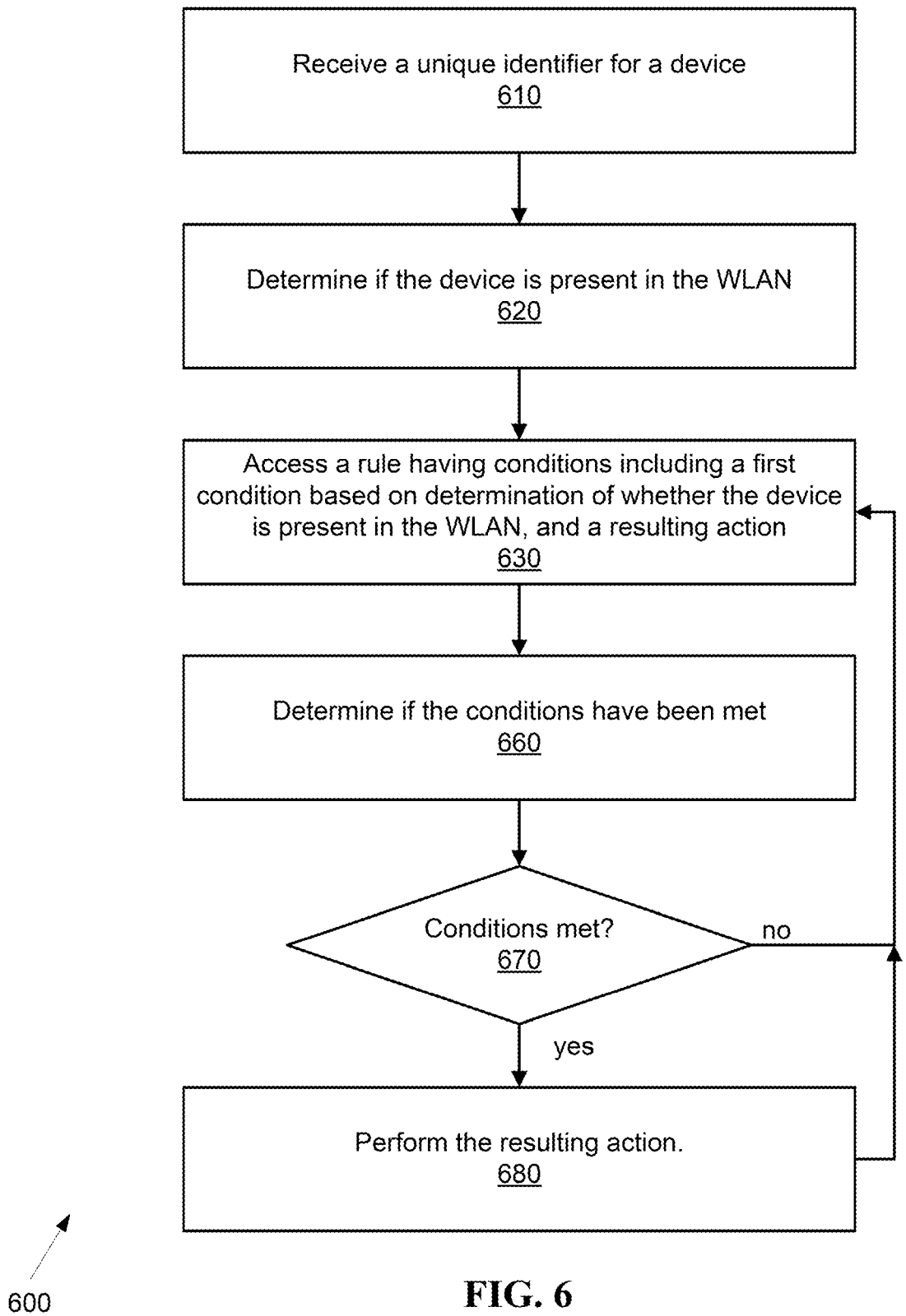
FIG. 6 is a flowchart of an exemplary method for home or away detection via mobile devices.

FIG. 6 is a flowchart of a first embodiment of a method 600 for a first device in a network, for example, a wireless local area network (WLAN) 160, or a wired network in communication with the WLAN. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

The first device may be, for example, a wired networked media rendering system in a wired network communicating with the WLAN 160, for example, via the AP 250 (FIG. 4A), or a wireless networked media rendering system 310 wirelessly communicating with the WLAN 160, for example, via the AP 250 (FIG. 4A). The first device is configured to receive a unique identifier of a second device, as shown by block 610. The unique identifier may be, for example, the MAC address of the second device. The second device may be, for example, a smart phone 110 associated with a specific individual.

The first device determines if the second device is present in the WLAN, as shown by block 620, as described further below and depicted in FIG. 7. The first device accesses a rule including conditions, as shown by block 630 including at least a first condition based on determination of whether the second device is present in the WLAN. For example, the first device may access a locally configured rule, or the rule may be received by the first device from the second device, or the first device may receive the rule from another device, or via a user interface on the first device. The rule also includes a resulting action. The first device determines if the conditions for the rule have been met, as shown by block 660 and branch 670. If the conditions have been met, the resulting action is performed, as shown by block 680.

Figure 7:
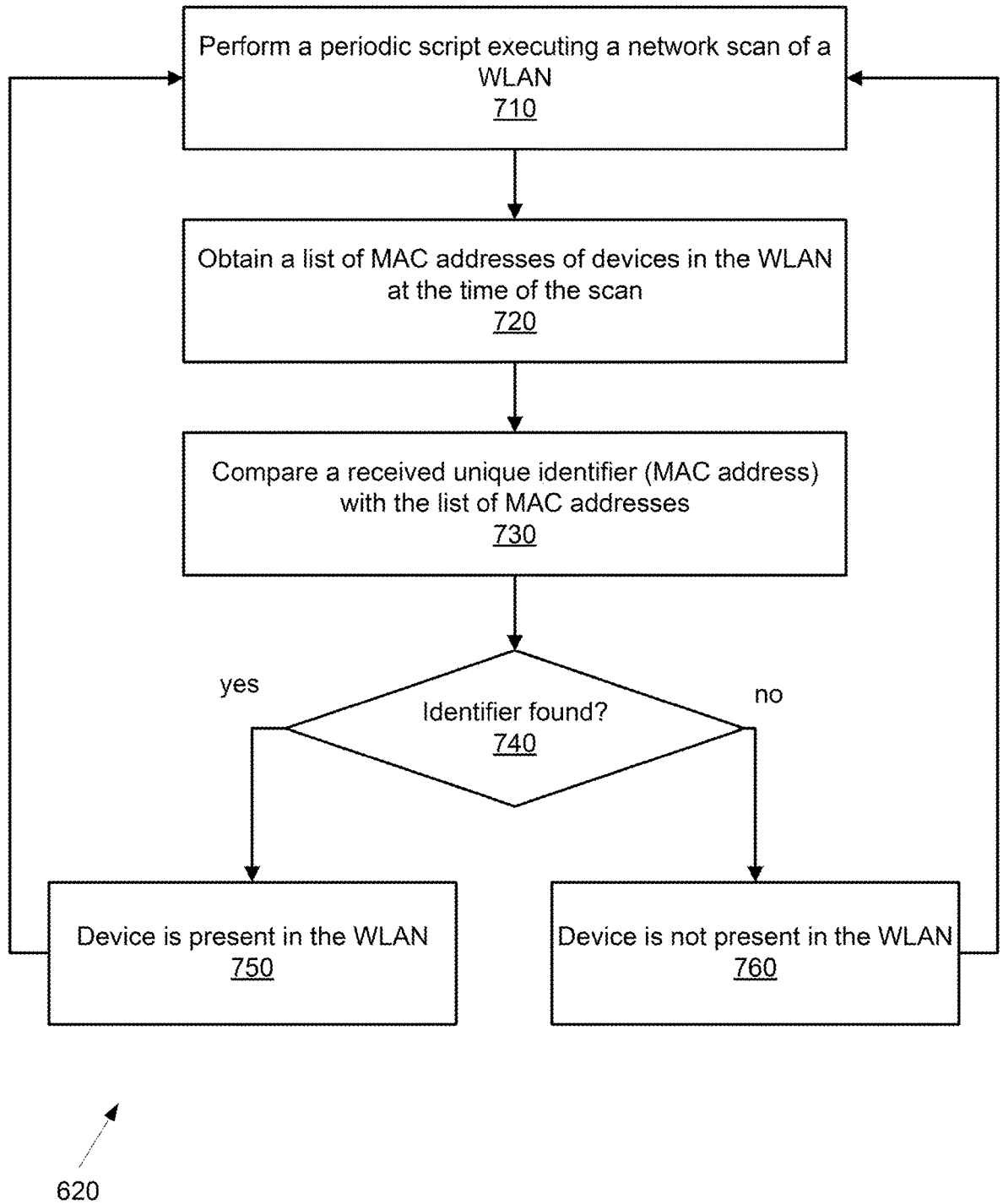
FIG. 7 is a flowchart of a detail of the exemplary method for home or away detection via mobile devices of FIG. 6.

FIG. 7 is a flowchart of a detail of block 620 of the exemplary method for home or away detection via mobile devices of FIG. 6, where the first device determines if the second device is present in the WLAN. A period network scan of the WLAN is performed, for example using a scan script, as shown by block 710. The scan may be, for example, an address resolution protocol (ARP) scan, as shown by FIG. 8. Returning to FIG. 7, the scan produces a list of MAC addresses of devices in the WLAN at the time of the scan, as shown by block 720. The received unique identifier (MAC address) is compared with the list of MAC addresses, as shown by block 730. If the unique identifier is found, as shown by block 740, the second device is determined to be present on the WLAN, as shown by block 750. Otherwise, the second device is determined to not be present on the WLAN, as shown by block 760. A time stamp may be associated with each scan, so that an approximate time of a device appearing in the WLAN (as indicated by its inclusion in the list 800), or of the device disappearing from the WLAN (as indicated by its absence from the list 800), may be determined. The appearance and/or disappearance of a device on the WLAN during a specified time window may be used as a condition for a rule, as described above.

Figure 5:
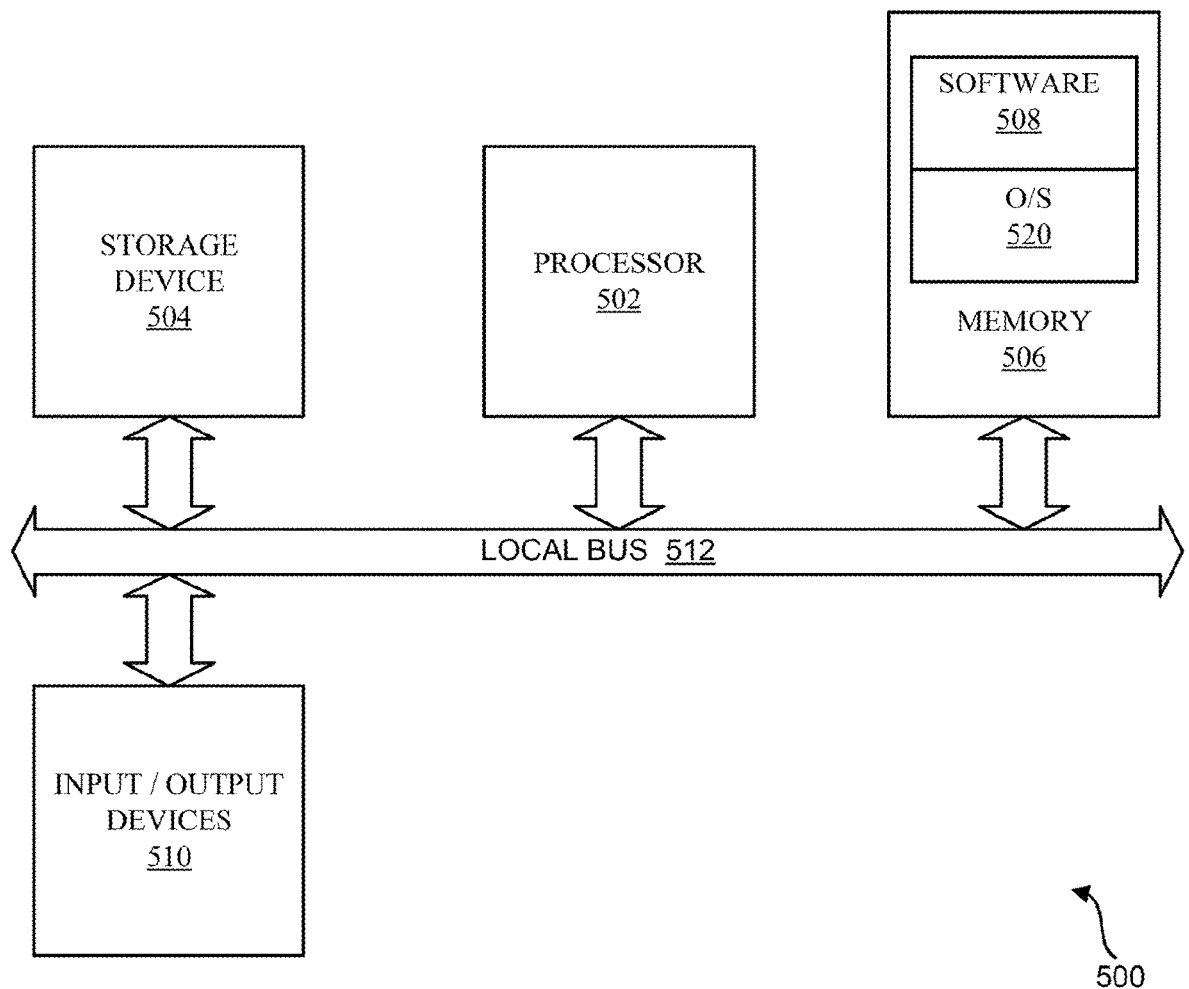
FIG. 5 is a schematic diagram illustrating an example of a system for executing functionality of the present invention.

The present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for a first network enabled device in a network comprising a wireless local area network (WLAN), the first network enabled device comprising a processor and a memory configured to store non-transitory instructions executable by the processor performing the steps of:
   determining whether a unique identifier for a second network enabled device is present in the WLAN;
   logging a first event indicating a change in a configuration state of the first network enabled device;
   logging a second event indicating when the second network enabled device becomes present in the network or is no longer present in the network;
   correlating the first event with the second event as a first correlation;
   formulating a rule based upon correlating the first event with the second event, the rule comprising:
      a condition further comprising a first criteria based on whether the second network enabled device is present in the WLAN; and
      a resulting action comprising the change in the configuration state of the first network enabled device to be performed by the first network enabled device.

2. The method of claim 1, wherein determining if the second network enabled device is present in the network further comprises scanning the network resource for the presence of the unique identifier for the second network enabled device.

3. The method of claim 2, wherein the unique identifier for the second network enabled device comprises a MAC address.

4. The method of claim 3, wherein determining if the second network enabled device is present in the WLAN further comprises the steps of:
   executing an address resolution protocol (ARP) scan of the WLAN; and
   comparing the MAC address of the second network enabled device to a list of MAC addresses produced by the ARP scan.

5. The method of claim 1, wherein the first criteria is based upon detecting a change of status of the second network enabled device comprising the second network enabled device becoming present in the network or the second network enabled device no longer being present in the network.

6. The method of claim 1, wherein the condition further comprises a second criteria, and a logical relationship between the first criteria and the second criteria.

7. The method of claim 6 wherein the second criteria comprises a time window for the occurrence of the first criteria.

8. The method of claim 1, wherein the first network enabled device comprises a media rendering device.

9. The method of claim 1, wherein determining if the second network enabled device is present in the WLAN further comprises the steps of:
   executing a network scan of the WLAN; and
   comparing the unique identifier of the second network enabled device to a list of identifiers produced by the network scan.

10. The method of claim 1, wherein the resulting action comprises the second network enabled device indicating that the first network enabled device is available to be controlled by the second network enabled device.

11. The method of claim 1, further comprising the steps of:
    notifying a user of the first network enabled device of the first correlation; and
    querying the user to implement the rule.

12. The method of claim 11, further comprising:
    determining if the condition has been met; and
    if the condition has been met, performing the resulting action.

13. A system in a network comprising:
    a network access point in communication with a wireless local area network (WLAN);
    a first network enabled media rendering device in communication with the WLAN via the network access point; and
    a second network enabled device,
    wherein the first network media rendering enabled device further comprises a processor and a memory configured to store non-transitory instructions executable by the processor performing the steps of:
       determining whether the second network enabled device is present in the WLAN;
       accessing a first rule comprising:
          a condition based on whether the second network enabled device is present in the WLAN; and
          a resulting media rendering action to be performed by the first network enabled media rendering device;
       determining if the condition has been met; and
       if the condition has been met, performing the resulting media rendering action,
    wherein the first network enabled media rendering device is configured to render stored and/or streamed audio and/or video content.

14. The system of claim 13, further comprising:
    a memory configured to record a plurality of events in a log, the first network enabled device performing the steps of:
       logging a first timestamp of a first event indicating a change in a configuration state of the first network enabled device;

logging a second timestamp of a second event indicating when the second network enabled device becomes present in the network and/or is no longer present in the network;
correlating the first event with the second event; and
formulating a second rule based upon correlating the first event with the second event.

15. A first network enabled media rendering device configured to communicate a wireless local area network (WLAN), the first network enabled device comprising a processor and a memory configured to store non-transitory instructions executable by the processor performing the steps of:
   determining whether a second network enabled device is present in the WLAN;
   accessing a rule comprising:
      a condition based on whether the second network enabled device is present in the WLAN; and
      a resulting media rendering action to be performed by the first network enabled media rendering device;
   determining if the condition has been met; and
   if the condition has been met, performing the resulting media rendering action,
   wherein the first network enabled media rendering device is configured to render stored and/or streamed audio and/or video content.

16. The device of claim 15 further comprising a network access point configured to provide the WLAN.

17. The device of claim 15, wherein the first network enabled device is further configured to perform the steps of:
   logging a first timestamp of a first event indicating a change in a configuration state of the first network enabled device;
   logging a second timestamp of a second event indicating when the second network enabled device becomes present in the network and/or is no longer present in the network;
   correlating the first event with the second event; and
   formulating a rule based upon correlating the first event with the second event.

* * * * *